United States Patent
Mack et al.

(10) Patent No.: US 7,589,826 B2
(45) Date of Patent: *Sep. 15, 2009

(54) LASER SCANNER

(75) Inventors: Stefan Mack, Freiburg (DE); Sebastian Pastor, Freiburg (DE); Hans-Werner Pierenkemper, Emmendingen (DE)

(73) Assignee: Sick AG, Waldkirch (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/001,996

(22) Filed: Dec. 12, 2007

(65) Prior Publication Data

US 2008/0151218 A1    Jun. 26, 2008

(30) Foreign Application Priority Data

Dec. 20, 2006    (DE) .................... 10 2006 060 108

(51) Int. Cl.
*G01C 3/08* (2006.01)
*G02B 26/08* (2006.01)
(52) U.S. Cl. ............... 356/5.01; 356/4.01; 359/204.1
(58) Field of Classification Search ....... 356/4.01–5.15; 359/196, 197, 204, 196.1, 197.1, 204.1
See application file for complete search history.

(56) References Cited

U.S. PATENT DOCUMENTS

| 4,521,107 | A | 6/1985 | Chaborski et al. | |
|---|---|---|---|---|
| 5,760,886 | A * | 6/1998 | Miyazaki et al. | 356/5.01 |
| 6,262,800 | B1 * | 7/2001 | Minor | 356/139.07 |
| 6,650,235 | B2 * | 11/2003 | Shirai et al. | 340/435 |
| 7,443,555 | B2 * | 10/2008 | Blug et al. | 359/196 |
| 2003/0123045 | A1 * | 7/2003 | Riegl et al. | 356/4.01 |
| 2005/0168720 | A1 * | 8/2005 | Yamashita et al. | 356/4.01 |

FOREIGN PATENT DOCUMENTS

| DE | 22 16 765 | B2 | 4/1972 |
|---|---|---|---|
| DE | 31 03 567 | C2 | 2/1981 |
| DE | 43 12 186 | A1 | 10/1994 |

(Continued)

*Primary Examiner*—Isam Alsomiri
(74) *Attorney, Agent, or Firm*—Townsend and Townsend and Crew, LLP

(57) ABSTRACT

A laser scanner which operates pursuant to the elapsed time principle and which has a pulsed laser that directs successive light pulses into a monitored region. The laser scanner further has a light receiving arrangement for receiving light pulses reflected by an object in the monitored region and that generates electric received signals which are fed to an evaluation unit for determining a distance between the object and the laser scanner based on the elapsed time between the emission of the light pulse and the receipt of the reflected pulse and the speed of light from which a distance signal is formed that is representative of the distance between the object and the scanner. There is a light diverter unit between the pulsed laser and the monitored region which continuously directs light pulses along different directions into the monitored region. A light source is provided which emits a light measuring signal of reduced strength which is also continuously directed into the monitored region in continuously changing directions. The light receiving arrangement is configured to receive the light measuring signal reflected by the object in the monitored region and to generate a reflection signal that is representative of the reflection characteristics of the object. The light pulses and the receiving signals are changeable in dependency of the reflection signal.

19 Claims, 3 Drawing Sheets

FOREIGN PATENT DOCUMENTS

| | | |
|---|---|---|
| DE | 100 41 182 A1 | 8/2000 |
| DE | 103 26 085 A1 | 4/2004 |
| EP | 1 160 585 A3 | 12/2001 |
| EP | 1 321 777 A3 | 6/2003 |
| JP | 11 352226 A | 12/1999 |
| WO | WO 89/07771 A1 | 8/1989 |
| WO | WO 2006/077588 A3 | 7/2006 |

* cited by examiner

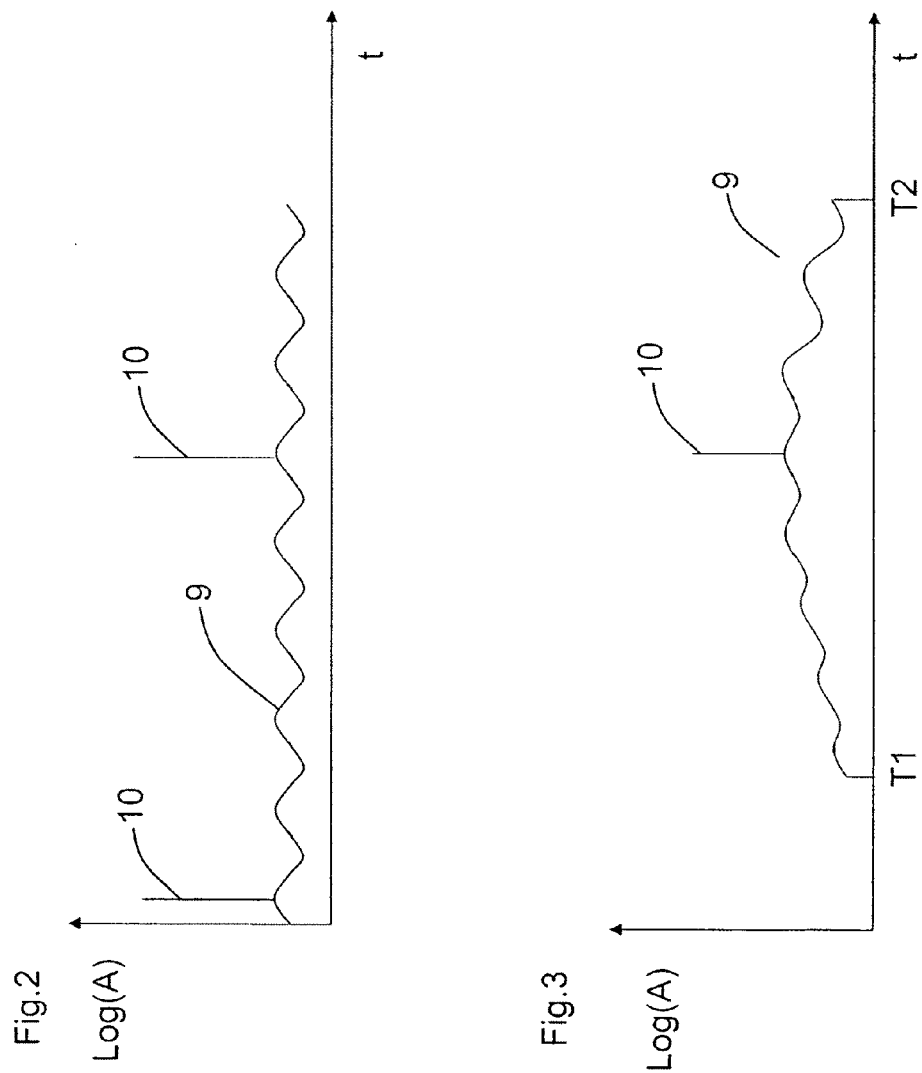

LASER SCANNER

CROSS-REFERENCES TO RELATED APPLICATIONS

This application claims the priority of German Application No. 102006060108.4, filed Dec. 20, 2006, the disclosure of which is incorporated herein by reference.

BACKGROUND OF THE INVENTION

This invention relates to a laser scanner in accordance with the preamble of claim 1.

Such a laser scanner or laser radar device is known from DE 43 40 756 A1. In that laser radar device, a pulsed laser directs controlled, successive light pulses into a monitored region. A light receiving arrangement detects light pulses that are reflected by an object in the monitored region and generates corresponding electric signals which are fed to an evaluation unit. The evaluation unit determines the distance between the object and the laser radar device and generates a representative distance signal on the basis of the time interval between the emission and receipt of the light pulse on the basis of the speed of light. A light diverter is arranged between the pulsed laser and the monitored region which directs the light pulses to the monitored region while continuously changing the direction of the pulses so that the entire monitored region is traversed by the light pulse. This is particularly useful for detecting objects within a dangerous zone. Due to their ability to determine distances, such laser radar devices detect not only the presence of an object; with the obtained distance information and the rotational angle of the light diverting unit, the precise position of the object can be determined.

The word "light" is not limited to visible light. For purposes of this application, "light" generally refers to electromagnetic radiation such as UV light, IR light, as well as visible light, which are commonly employed by optoelectronic sensors.

This state of the art is disadvantageous when the laser radar device monitors a large region where objects with widely differing reflection characteristics must be detected. Prior art laser radar devices therefore typically permanently employ very high signal dynamics for the light receiving arrangement and the associated signal processor. High signal dynamics entail high production costs and can functionally interfere with the laser radar device. Reasons for such functional interferences are, for example, external interfering light sources in the immediate vicinity of the monitored region that emit light which can reach the light receiving arrangement of the laser radar unit. Since the detection sensitivity of the light receiving arrangement must be set for the lowest expected signal strength generated by dark objects in the monitored region, such external light sources can significantly interfere with the proper functioning of the light receiving arrangement because the external light generates significant background noise which is superimposed onto the actual measurement signal. A similar effect occurs when the light pulse from the laser radar device strikes an object having a very high reflectivity and located in the immediate vicinity of the laser radar device. The resulting received signals generate saturation effects and/or background noise influences which significantly compromise the accuracy of the distance measurement. Prior art solutions for avoiding such problems with optoelectronic sensors seek to suppress the interference by conducting multiple measurements and, for example, reducing the measurement errors with average measurement values. It is also known to repeat incorrect measurements by changing the detection sensitivity of the light receiving arrangement. Such techniques cannot be used with laser radar devices that change the direction of the light because the beam direction of two or more successive light pulses are changed to such a degree that different objects or object segments are struck by them which cannot be related to each other. This can be reduced by correspondingly reducing the changes in the light directions, but this is not practically possible because the reaction time of the laser radar device would thereby be correspondingly reduced.

BRIEF SUMMARY OF THE INVENTION

It is an object of the present invention to provide an improved laser scanner which employs the elapsed time principle.

This object is attained with a laser scanner made in accordance with the present invention that employs the elapsed time principle and uses a pulsed laser that directs successive light pulses into a monitored region. The laser scanner has a light receiving arrangement that receives light pulses reflected by an object in the monitored region and that generates corresponding electrical received signals which are fed to an evaluation unit. The latter then generates a distance signal representative of the distance between the object and the laser scanner on the basis of the time that elapsed between the emission and receipt of the light pulse and the speed of light. A light diverting unit is further arranged between the pulsed laser and the monitored region which continuously changes the directions in which the light pulses are directed into the monitored region. A light source is provided which emits a light measuring signal of reduced strength which is also directed into the monitored region by the light diverting unit along continuously changing directions. The light source can be in addition to and separate of the pulsed laser, or the pulsed laser can also be the light source. The light receiving arrangement receives portions of the light measuring signal as received signals reflected by the object in the monitored region and is configured to generate a remission signal that depends on the reflection characteristics of the object. The light pulse or the received signals can be varied on the basis of the remissions signal.

This makes it possible to change the emitted light pulse in dependence on the reflection characteristics of the surroundings and of the object that is to be detected. If, for example, much light of the light measuring signal is received back due to a high reflectivity of the object, the strength of the emitted light pulses can be appropriately reduced. In this manner, the received signal of the light pulses can be optimally set for the operating range of the light receiving arrangement. This also helps to avoid an overreaction in the light receiving arrangement, which leads to an improved detection accuracy and reliability.

An advantage of the invention is that the detection sensitivity for the receipt of the light signal can be set in dependence on the light intensity of the light receiving arrangement for the light measuring signals. The reflection measurement made with the light measuring signal permits an adjustment of the actual detection sensitivity of the light receiving arrangement so that the amount of light from the light signal reflected by the object lies in the optimal operating range of the light receiving arrangement. This provides an additional measurement system and permits one to generate a reflection characteristic prediction for the light pulse without reducing the operating speed of the laser scanner.

An electronic signal processor which preferably follows the light receiving arrangement is used to preset the detection sensitivity of the light receiving arrangement for the next light pulse on the remission signal of the light measuring signal. In a preferred embodiment of the invention, the detection sensitivity for the light pulse is set by appropriately varying a switching threshold and/or an amplification factor in the electric evaluation unit associated with the light receiving arrangement that receives the light pulse. Such an adaptation of the detection sensitivity of the laser scanner to the anticipated reflection values renders the laser scanner much less susceptible to interferences which can be caused, for example, by exterior light sources.

The light receiving arrangement is configured to adjust the amplification of the received light pulse by an avalanche photodiode in dependency on the remission signal. This advantageous embodiment of the present invention sets the avalanche photodiode voltage in the light receiving arrangement as a function of the actual or measured light measuring signal. Aside from reducing the potential adverse effects external light can have on the laser scanner, this also provides an improved temperature compensation for the avalanche photodiode. In addition, for high reflectivities, this improves the measurement accuracy because the downstream electronic evaluation unit is less likely to be overcompensated.

The light measuring signal has a relatively lesser strength and advantageously is significantly smaller than the strength of the light pulses and, in the preferred form, the strength of the light measuring signals is about 1% of that of the light pulses. Objects to be detected can have differing reflection characteristics. Very bright and in particular mirrored surfaces have a very high reflectivity, and very dark objects have a lesser reflectivity, which, at a minimum, may be approximately 1.8% according to applicable guidelines. When a light pulse strikes an object, the electronics should not be overcompensated because this would lead to wrong measurements. For such cases, it is advantageous that the light measuring signal has such a small strength. A further advantage is that even when measuring the reflectivity of the object with the light measuring signal, no overcompensation will be encountered. Reliable conclusions can therefore be drawn concerning the reflection characteristics of the object.

In a further embodiment of the invention, the light source is formed by the pulsed laser. Thus, no additional light source is needed because the pulsed laser can perform the functions of the light source. The light source therefore illuminates the to-be-detected object with a light that has the same optical spectrum for measuring the reflection characteristics of the object and illuminating the object with the light pulse. By using the pulsed laser for measuring the reflectivity as well as detecting the object, another electronic unit for controlling an additional light source is not needed. Systemic errors are also reduced by using only one pulsed laser.

In addition, only the pulsed laser must be precisely aligned. The need for aligning an additional light source is eliminated.

In another embodiment of the invention, an electronic control unit for the pulsed laser has means for setting the output strength of the light pulses as a function of the signal strength measured with the light measuring signal. By adapting the output of the pulsed laser to the prevailing operating conditions, the pulsed laser can be advantageously operated in a range and under conditions which do not unnecessarily burden the pulsed laser. This significantly lengthens the operating life of the pulsed lasers.

In a further embodiment of the invention, the light measuring signal is a continuous constant light signal which overlies the light pulse. The pulsed laser can also be controlled with a constant current. If the constant current is sufficiently small, the pulsed laser emits constant light of a reduced intensity. By using constant light signals, the reflections from the surroundings can be determined at any point in time. As a result, the light strength or intensity of the pulsed laser can at any time be adjusted to adapt it to the to-be-detected object.

In a further development of the invention, the light receiving arrangement separates the received light measuring signals from the received light pulses. In this manner, the light measuring signal can be evaluated independently of the received light pulses. This has the advantage that the light measuring signals contain no other components, such as interfering light, during the evaluation of the light measuring signal. The sensitivity of the evaluation unit for the light measuring signal can therefore be changed to accurately adapt it to the value of the measuring signals. The separation can also be performed by the evaluation unit. In that case, the electronic signals of the light measuring signal and of the received light pulses can be separated in the evaluation unit and further used.

When using constant light for the light measuring signal, the means for separating the received light measuring signal and the received light pulses can be a frequency separator ["Frequenzweiche" in German] with which the electronic signals of the constant light can be separated from the signals of the light pulses, which have a pulse frequency. This permits an evaluation of the received constant light measuring signals at any time so that the reflection characteristics of the object can be determined at any desired point in time.

In addition, the constant light can be modulated with a small modulation depth and superimposed onto the light pulses. The light receiving arrangement of the laser scanner is configured so that it receives the modulated constant light signal as well as the actual light pulse. This modulation assures that the reflected constant light is not an external light, but light generated by the laser scanner.

In a further development of the invention, the light measuring signal is a light pulse measuring signal. In this manner, the to-be-detected object can at a given point in time be illuminated with the light pulse measurement signal for detecting the reflection characteristics at a precise, fixed position. For this purpose, the light pulse measuring signal is directed onto the to-be-detected object with a small divergence angle to effectively suppress interfering reflections from neighboring objects. In this manner, the reflectivity of objects can be accurately determined.

In another preferred embodiment of the invention, the light pulse measuring signal is followed by a light pulse at a temporal distance that is less than 1 µs. In a conventional manner, the light pulses are continuously directed into the surroundings by a rotating mirror of the laser scanner. When the light pulse signal is emitted about 1 µs ahead of the light pulse, the light pulse signal is spatially close to, that is, at a very small angular distance from, the light pulse. As a result, the measured reflection characteristics are taken at substantially the same location where the subsequent light pulse is reflected by the object.

It is also possible to optically separate the light measuring signal from the main beam, for example with a screen placed over the diverting mirror. A particularly attractive manner of splitting the measurement beam from the main beam is to place the optical screen over the center of the diverting mirror where the emitted beam strikes the mirror. This screen reflects approximately 99% in the zeroth order (that is, 99% of the emitted beam remains unaffected) and 1% in the plus first order. When the direction of the plus first order coincides with the direction in which the next pulse will be sent, the beam of the first order represents the measurement beam, which precedes the main beam by one angular increment.

With pulsed light measuring signals, a distance signal for the distance between the object and the laser scanner can be formed. An advantage of this embodiment is that redundant distance information is provided which can be used for increasing the reliability, or for testing a plausibility. A further advantage of the redundant determination of the distance signal is that, in addition to the determined reflection characteristics, distance information is provided where these reflection characteristics are encountered. Inferences can then be drawn about the absolute reflection characteristics of the object. By following moving objects in the monitored region, their reflection characteristics can be precisely determined in dependency on the distance. Distance-depending reflection characteristics measurement improves the identification of moving objects. For example, an object with high reflectivity will reflect an amount of light from a distance which is comparably less than the amount of light reflected by the same object from a close location. Thus, an object can even be classified on the basis of its reflection characteristics independent of its distance. For recognizing objects, two different significant characteristics are therefore available, one for the distance of the object and the other for its reflection characteristics.

Another feature of the present invention is that the light receiving arrangement can evaluate several successive light measuring signals during one rotational movement of the light diverting unit. This permits establishing an average value and/or extrapolating the reflection characteristics of the object. Especially when the surface has contrasting portions of a size which correspond to the size of the light spot formed by the light pulse, an average value has the advantage that the to-be-emitted light pulse can be optimally adapted to the encountered contrasting surface.

Accordingly, several light measuring signals from different rotational motions of the light diverting unit, but which are received in the same direction from the monitored region, can be evaluated by the light receiving arrangement. As a result, light measuring pulses which are reflected from almost the same location of an object to be detected can be used for a variety of purposes. This helps to significantly reduce the impact of incorrect measurements.

In a particular embodiment of the invention, the light receiving arrangement is a regulator. The light measuring signals establish an actual value, which can be compared to a predetermined desired value for varying the setting value for the light pulse or received signals. The use of a regulator permits a rapid and automatic adaptation of the light pulse or the received signals. By using differing regulator characteristics, the regulator can be adapted to the expected reflections from a given surroundings.

In a further embodiment of the present invention, a control switch is provided as the control unit for controlling the light source with two avalanche transistors. A first transistor is used for generating the light pulses and a second transistor for generating the light measuring signals. In this way, the light pulse and the light measuring signal can be generated independently of each other. In particular, with the independent transistor steps, it is possible to generate the light pulse and the light measurement signal which can be temporally spaced apart by less than 1 µs. An avalanche transistor is a bipolar transistor that has a collector-base distance that operates in the break-down range. In that case, negative differential resistances of the switching elements occur. The break-down results in very steep switching flanks caused by rise speeds of several hundred volts per nano second. This permits the use of very short laser pulses having a duration of only a few pico seconds.

In addition, the respective collectors of the first and second transistors of the output circuit have a separate high voltage supply, and both transistors have a resistor and a charging capacitor for generating the required output powers for the light source and the pulsed laser. With the separate high tensions and different charge capacitors, the light pulse and the light measuring signal can be independently generated with different output energies. With respective high voltages between about 100 to 400 volts, the charge capacitor is charged via a charge resistor. By controlling the respective avalanche transistors with a control pulse applied to the base connection, the capacitor is discharged with a discharge current through the light source and the pulsed laser.

According to another aspect of the invention, a resistor and an inductivity are serially connected to the collector for setting a resonant circuit frequency and dampening. The discharge of the charge capacitor via the light source and the pulsed laser typically corresponds to one-half period of an aperiodic oscillation in an LC resonant circuit comprising the inductivity and the charge capacitor. To permit adjusting the pulse duration or aperiodicity of the light measuring signal, the inductivity and resistor are connected in series.

In the following, the present invention is described in more detail by reference to exemplary embodiments and the accompanying drawings.

BRIEF DESCRIPTION OF THE DRAWINGS

FIG. 2 is a logarithmic illustration of an emitted light pulse and a light measuring signal;

FIG. 3 is a logarithmic illustration of the received light pulse and the light measuring signal.

DETAILED DESCRIPTION OF THE PREFERRED EMBODIMENTS

Figure 1:
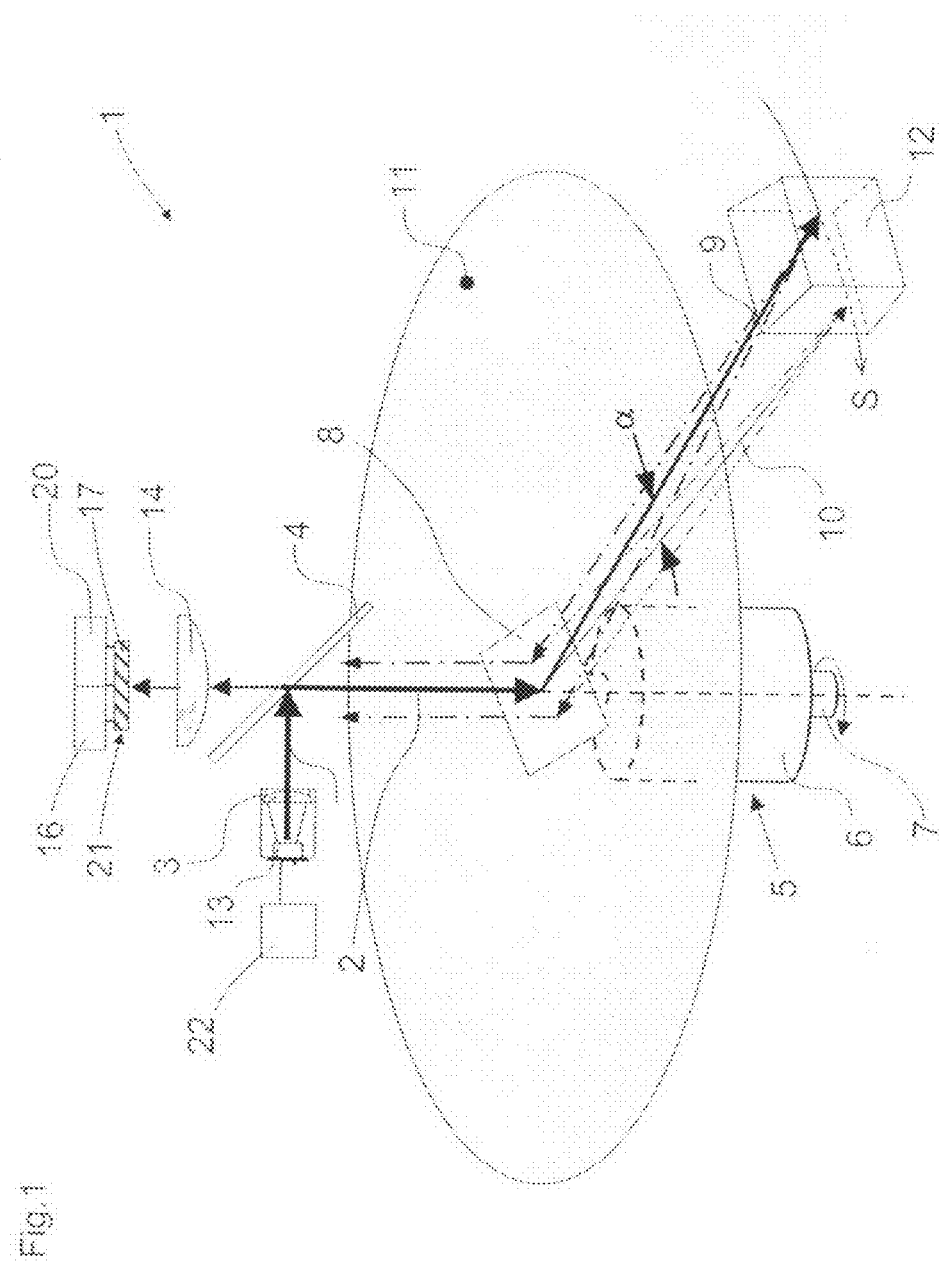
FIG. 1 schematically shows a laser scanner constructed in accordance with the invention.

In the following the invention is described with reference to the embodiment of the invention shown in the drawings. FIG. 1 is a schematic, perspective view of a laser scanner 1 that emits light pulses 10 and a light measuring signal 9.

Such laser scanners are generally known from German patent publication DE 43 40 756 A1, the contents of which are incorporated herein by reference which corresponds to U.S. Pat. No. 5,455,669. This laser scanner operates on the basis of the elapsed time taken by the light; that is, successive light pulses are directed into a monitored region via a rotating mirror at a continuously changing angle. Pursuant to principles of autocollimation, received light pulses are evaluated on the basis of the elapsed time between the emission and receipt of light pulses while taking the speed of light into account. A distant signal is thereby generated which is representative of the distance between the laser scanner and an object. With the known angle of the rotating mirror, the position of the object in space can be determined.

A pulsed laser 13 emits successive light pulses 10 and light measuring signals 9. For emitting light pulses 10 and light measuring signals, separate light sources can be employed. For example, the separate light sources can be arranged on a common chip to thereby position them sufficiently close to each other. The use of pulsed laser 13 as a common light source has the advantage that light pulses 10 and light measuring signals 9 can have the same optical characteristics; for example they can have the same optical wavelength. Further, only a single light source is required for generating both signals. A control unit 22 is arranged in front (downstream) of pulsed laser 13 for adjusting the output power of light pulses 10.

An emitter lens or objective 3 is arranged in front of pulsed laser 13 to influence its light beam characteristics. Light pulses 10 and light measuring signals 9 emitted from emitting lens 3 are partially diverted by a beam splitter 4 so that the diverted light is aligned with an axis of rotation of a light diverting unit 5. Light diverting unit 5 includes a motor 6 with a motor shaft 7 and a rotating mirror 8 arranged at an angle of 45° to motor shaft 7. As a result of their movement in a scanning direction S, light measuring signal 9 and light pulses 10 create a scanning plane 11, the center of which is the axis of rotation of light diverting unit 5.

By emitting light measuring signal 9 ahead of light pulse 10, an object 12 to be detected is initially struck by light measuring signal 9. When light measuring signal 9 strikes object 12, part of the light measuring signal is reflected or remitted to an extent that depends on the surface characteristics of object 12. A portion of the remitted light is reflected upon itself, strikes rotating mirror 8, and is returned to light receiving arrangement 17 via the partially transmitting beam splitter 4 and receiving optics 14.

A signal processor 20 is positioned behind (upstream of) light receiving arrangement 17. Light receiving arrangement 17 can be configured so that it separates the received light measuring signal 9 from the received light pulses 10. If, for example, light measuring signal 9 is a constant light signal or a modulated constant light signal with a modulation frequency, and the pulse frequency of received light pulses 10 differs from the modulation frequency, an evaluation unit 16 can separate the signals with the help of a frequency splitter or diverter ["Frequenzweiche" in German]. When the light measuring signal 9 is a light pulse measuring signal, the latter can be separated from light pulses 10 in evaluation unit 16 by employing differing time windows. The temporal difference between light pulse measuring signal 9 and light pulses 10 is typically less than 1 microsecond. In this way, the light pulse measuring signal 9 strikes the object temporally and spatially very close to when and where light pulse 10 strikes the object. As a result, the light pulse measuring signal 9 detects the reflection characteristics of the surface of object 12 that is to be detected spatially close to where light pulses 10 strike object 12.

By processing light measuring signal 9 with the electronic signal processor 20, the reflection characteristics of object 12 can be determined in accordance with the present invention. With the established reflection characteristics of object 12, the signal strength of subsequent light pulses 10 can be varied so that the detection sensitivity of light receiving arrangement 17 can be adjusted to reflect the established reflection characteristics of the object.

Emitted light measuring signal 9 has a reduced strength as compared to that of light pulse 10. Based on the sensitivity of light receiving arrangement 17 and the reduced strength of light measuring signal 9, the reflections from object 12 that is to be detected can be precisely determined. The signal strength of the received light measuring signal 9 is therefore proportional to the reflection characteristics of the to-be-detected object 12. The strength of light measuring signal 9 is approximately 1% of the strength of a light pulse 10.

Light receiving arrangement 17 is preferably an avalanche photodiode. Based on the reflection value for the received light measuring signal 9, the amplification of the photodiode can be set or the output strength of pulsed laser 13 can be adjusted via control unit 22.

FIG. 2 schematically illustrates the logarithmically plotted amplitudes A of the light pulses 10 and light measuring signal 9 emitted by the laser scanner of FIG. 1 over time t. The light measuring signal 9 in the illustrated example is a modulated constant light signal. Control unit 22 lets light pulses 10 be emitted in regular time intervals as already extensively discussed with respect to FIG. 1. Light pulses 10 overlie light measuring signal 9 and have a significantly greater amplitude A than the modulated constant light signal. The emitted light pulses 10 and the modulated constant light signal in this example strike a retro-reflecting object (not shown) in the monitored region. As an example, the retro-reflecting object can be an orientation sign or marking in the monitored region.

Based on the emitted signals illustrated in FIG. 2, FIG. 3 shows, also on a logarithmic scale, the received light pulses 10 and the received light measuring signal 9 reflected from the retro-reflecting object in the monitored region. The modulated constant light signal is only detected during the time interval between timing points T1 and T2, which corresponds to the time during which the scanned light beam scans over the reflector. The strength of the received light measuring signal 9 or a modulation depth of the received light measuring signal 9 provides an indication of the reflection characteristics of the object. On this basis, the signal strength of the emitted light pulse can be adjusted or the sensitivity of the light receiving arrangement can be set.

Figure 4:
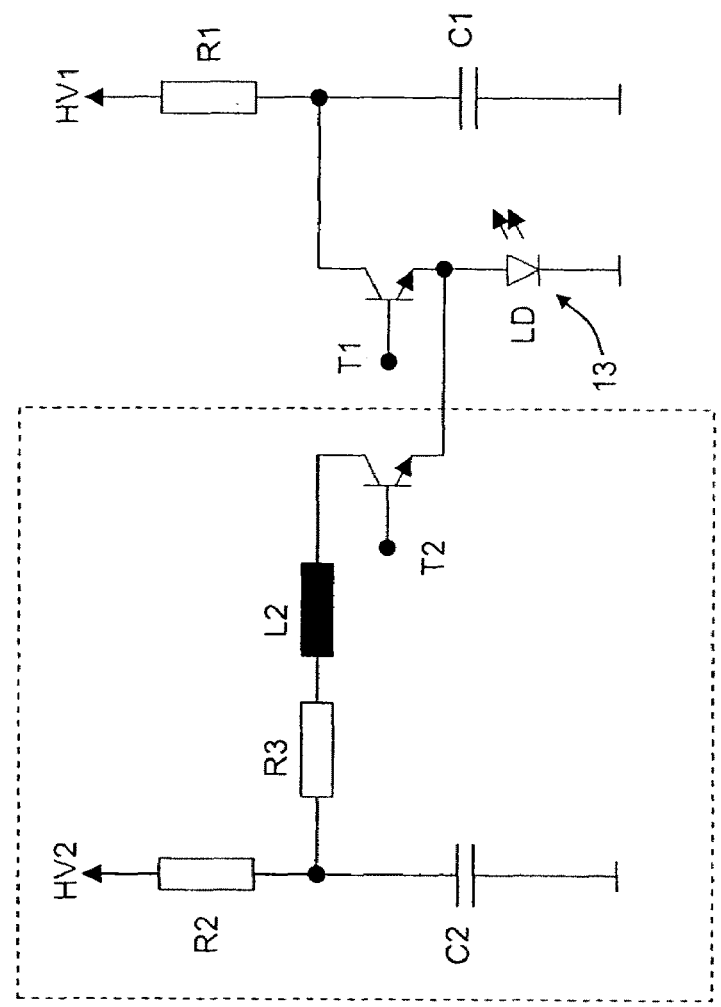
FIG. 4 is a schematic showing the circuitry of the present invention for generating measuring and light pulses.

FIG. 4 illustrates the circuitry of the present invention for generating a light measuring pulse and a light pulse. An effective method for generating the pulses is to discharge one capacitor C1 or C2 by means of the avalanche effect of bipolar transistors T1 and T2. The avalanche effect is a defined breakdown behavior of the collector-emitter distance of the employed transistor with a very low rise time and a high rate of current increase at very high peak currents up to 100 A. Since the avalanche effect is only useful at high voltages, which, depending on the transistor type, can be in the range of 100-400V, the capacitor C1, C2 that is to be discharged is charged with the applicable high voltage HV1 or HV2. The selected avalanche transistors have a high degree of reproducibility of their break-down voltage. Conventional transistors can also be used, but they will have a relatively short service life. The pulse width and the rise time of the light pulse or the light measuring pulse primarily depend on the time constant of the discharge circuit. Controlling the base of transistors T1 and T2 assures a temporally defined pulse behavior. The initial strength of the pulses is almost proportional to the current flow through a laser diode LD, which forms the pulsed laser and the light source. The attained pulse strength depends to a large extent on the capacity of the discharge condensers C1, C2 and on the high voltage HV. The electric energy E is $$E = \frac{1}{2} * C * HV^2,$$

wherein C is the capacitance of the charging capacitor and HV is the high voltage. The light pulse or the light measuring pulse are almost independent from the trigger pulse at the base of transistors T1 and T2.

In accordance with the invention, two independent transistors T1 and T2 are provided. Transistor T1 generates the light pulses, and transistor T2 generates the light measuring pulses. The emitters of the two transistors T1 and T2 are each connected to each other and to laser diode LD for generating the light pulses. The second connection of laser diode LD is connected to ground. Control electronics (not shown) is connected to the base connection of transistor T1 and provides the point in time when a light pulse is to be emitted. Charging capacitor C1 is connected to the collector terminal of transistor T1, and its second terminal is grounded. Capacitor C1 is charged via resistor R1 by high voltage supply HV1. The charged capacitor C1 serves as an energy source for laser diode LD as soon as transistor T1 is appropriately activated. When an activation pulse is applied to the base of transistor T1, an avalanche break-down of the collector-emitter distance of transistor T1 occurs and a short light pulse with a duration of a few pico to nano seconds is emitted via laser diode LD.

Transistor T2 generates light measuring pulses and is arranged parallel to transistor T1. For this, a second, if desired independent, high voltage supply HV2 is provided. It charges the second charge capacitor C2 via a resistor R2 with the help of the high voltage supply. Between capacitor C2 and the collector of transistor T2 are an additional resistor R3 and an inductivity L2. This resistor R3 and the associated, serially connected inductivity L2 are provided for setting a time constant and/or dampening of an LC resonant circuit which comprises the inductivity L2 and capacitor C2. When the required control signal is applied to the base of transistor T2, an avalanche break-down takes place on the collector-emitter distance due to the high voltage from the second charge capacitor C2, and the laser diode LD emits a light measuring pulse.

Due to the independent switching elements of transistors T1 and T2, laser diode LD can be controlled independently but temporally offset with respect to each other for generating the light measuring pulses and the light pulses.

Aside from the electronic circuitry and components of the laser scanner, an appropriate mechanical construction of the laser controls and an appropriate selection of electronic components are of importance. Each transmission path has its own inductivity which, due to the rapid current rise and the high current amplitudes, strongly influences the temporal progress of the current and therewith of the light pulse and the light measuring pulse. The construction of the laser control on the basis of SMD technology and a carefully planned plate layout are necessary to attain high quality measuring results. For currents of several 10 A, even the smallest conductor resistances, especially at the grounding surface, on the order of magnitude of a few 10 milliohms influence the pulsing. A strict HF-shielding of the laser pulse controls is highly advisable so that nearby receiving systems are not interfered with.

Reference Signs
1 laser scanner
2 light beam
3 emitting lens
4 beam splitter
5 light diverting unit
6 motor
7 motor shaft
8 rotating mirror
9 light measuring signal
10 light pulse
11 scanning plane
12 object
13 pulsed laser
14 receiving optics
16 evaluation unit
17 light receiving arrangement
20 signal processor
21 avalanche photodiode
22 control unit
S scanning direction
α angle
A amplitude
T1, T2 points in time
HV1, HV2 high voltage supply
R1, R2, R3 resistors
C1, C2 charge capacitors
L2 inductivity
T1, T2 avalanche transistors
LD laser diode

What is claimed is:

1. A laser scanner operating on the basis of the elapsed light transmission time principle comprising a pulsed laser (13) adapted to direct successive light pulses (10) into a monitored region,
   a light receiving arrangement (17) for receiving light pulses (10) reflected by an object (12) in the monitored region and directing corresponding received electric signals to an evaluation unit (16) which generates a distance signal reflecting a time difference between an emission and a receipt of the lightpulse (10) and the speed of light and which is representative of a distance between the laser scanner (1) and the object,
   a light diverting unit (5) arranged between the pulsed laser (13) and the monitored region which continuously changes a direction of the light pulses (10) directed into the monitored region,
   a light source emitting light measuring signals (9) of a reduced strength arranged so that the light diverting unit (5) also continuously changes a direction of the light measuring signals directed into the monitored region,
   the light receiving arrangement (17) being positioned to receive light measuring signals (9) reflected by the object in the monitored region and configured to generate a reflection signal that is representative of the reflection of the light measuring signals (9) by the object, and
   wherein the light pulses (10) or the received electric signals are variable in dependency of the reflection signal.

2. A laser scanner according to claim 1 including an electronic signal processor (20) coupled to the light receiving arrangement (17) for adjusting a detection sensitivity of the light receiving arrangement (17) for a light pulse (10) to be received in dependency of the reflection signal.

3. A laser scanner according to claim 1 including an avalanche photodiode (21), and wherein the light receiving arrangement (17) is adapted to adjust an amplification for the received light pulses (10) by the avalanche photodiode in dependency of the reflection signal.

4. A laser scanner according to claim 1 wherein the light measuring signals (9) have a reduced power that is substantially smaller than, and in particular is approximately 1% of, a power of the light pulses (10).

5. A laser scanner according to claim 1 wherein the light source comprises the pulsed laser (13).

6. A laser scanner according to claim 1 including a control unit (22) for the pulsed laser (13) configured to adjust an output power of the light pulses (10) in dependency of the reflection signal.

7. A laser scanner according to claim 1 wherein the light measuring signal (9) is a continuing constant light signal which overlies the light pulses (10).

8. A laser scanner according to claim 1 wherein the light receiving arrangement (17) includes a separator for separating the received light measuring signals (9) and the received light pulses (10).

9. A laser scanner according to claim 8 wherein the separator is a frequency splitter.

10. A laser scanner according to claim 7 wherein the constant light signal is a modulated signal.

11. A laser scanner according to claim 1 wherein the light measuring signal (9) is a light pulse measuring signal.

12. A laser scanner according to claim 11 wherein the light pulse measuring signal is followed by a light pulse (10) which has a temporal distance of less than 1 μs.

13. A laser scanner according to claim 11 wherein the distance signal representative of the distance between the object and the laser scanner (1) is generated on the basis of the light pulse measuring signal.

14. A laser scanner according to claim 1 including a light diverting unit (5) and wherein the light receiving arrangement (17) is configured to evaluate several successive light measuring signals (9) generated during a single rotational sensing movement of the light diverting unit.

15. A laser scanner according to claim 1 wherein a light diverting unit (5) comprises a rotatable unit, and wherein the light receiving arrangement (17) is configured to evaluate several light measuring signals (9) caused by different rotating motions of the light diverting unit and received from the monitored region along a common direction.

16. A laser scanner according to claim 1 wherein the light receiving arrangement (17) comprises a regulator, wherein the light measuring signals define an actual value that is to be compared with a predetermined desired value and that is adjustable for setting the light pulses (10) or the received signals.

17. A laser scanner according to claim 1 wherein the control unit (22) comprises a control circuit for controlling one of the pulsed laser (13) and the light source with first and second avalanche transistors (T1, T2), wherein the first transistor (T1) is provided for generating the light pulses (10) and the second transistor (T2) is provided for generating the light measuring signals (9).

18. A laser scanner according to claim 17 wherein each of the first and second transistors ($T_1$, $T_2$) have separate high voltage potentials (HV1, HV2) forming a voltage supply on respective collectors of an output circuit, and wherein the transistors ($T_1$, $T_2$) include resistors (R1, R2) and a charging capacitor (C1, C2) for generating the output power for the pulsed laser (13).

19. A laser scanner according to claim 18 wherein a collector contact of the second transistor (T2) includes a resistor (R3) and a serially connected inductivity (L2) for adapting at least one of a time constant and a dampening for an LC resonant circuit to the inductivity (L2) and the charging capacitor (C2).

* * * * *